US011410200B2

(12) United States Patent
Squire et al.

(10) Patent No.: US 11,410,200 B2
(45) Date of Patent: Aug. 9, 2022

(54) SYSTEMS AND METHODS FOR GENERATING A CUSTOM CAMPAIGN

(71) Applicant: Verb Technology Company, Inc., Newport Beach, CA (US)

(72) Inventors: Brycen Squire, Draper, UT (US); McKinley Oswald, Lehi, UT (US); Jason Matheny, Highland, UT (US); Colby Allen, Pleasant Grove, UT (US); Jeremy James Oswald, Lehi, UT (US); Alex Dayton Cooper, American Fork, UT (US); Jacob C. Howell, Eagle Mountain, UT (US); Curtis John Gibby, Lehi, UT (US)

(73) Assignee: Verb Technology Company, Inc., Newport Beach, CA (US)

( * ) Notice: Subject to any disclaimer, the term of this patent is extended or adjusted under 35 U.S.C. 154(b) by 0 days.

(21) Appl. No.: 16/866,475

(22) Filed: May 4, 2020

(65) Prior Publication Data

US 2020/0334714 A1    Oct. 22, 2020

Related U.S. Application Data

(63) Continuation of application No. 15/260,946, filed on Sep. 9, 2016, now Pat. No. 10,643,247.

(51) Int. Cl.
*G06Q 30/00* (2012.01)
*G06Q 30/02* (2012.01)
*G06F 3/04842* (2022.01)

(52) U.S. Cl.
CPC ..... *G06Q 30/0271* (2013.01); *G06F 3/04842* (2013.01); *G06Q 30/0277* (2013.01)

(58) Field of Classification Search
CPC ............ G06Q 30/0271; G06Q 30/0277; G06F 3/04842
See application file for complete search history.

(56) References Cited

U.S. PATENT DOCUMENTS

| 10,643,247 B2 | 5/2020 | Squire et al. |
| 2012/0226743 A1 | 9/2012 | Smargon |
| 2013/0343726 A1* | 12/2013 | Shackleton ............ H04N 21/47 386/282 |
| 2014/0351002 A1 | 11/2014 | Pessis et al. |

(Continued)

OTHER PUBLICATIONS

Fragmob.com; https://web.archive.org/web/20160713123528/http://fragmob.com/, captured Jul. 13, 2016.

(Continued)

*Primary Examiner* — Alvin L Brown
(74) *Attorney, Agent, or Firm* — KPPB LLP

(57) ABSTRACT

The present disclosure provides systems and methods for personalizing a campaign to a recipient based on interactive surveys. A link to the interactive survey, unique to each recipient, is sent to each recipient to track survey responses. The systems and methods may track the answers, the time spent in each section, and the recipient's eye movement. Based on the tracked information, the systems and methods identify one or more interests of the recipient and match a related product to that interest. The systems and methods generate a campaign for the recipient based on the identified interests for the related product.

20 Claims, 14 Drawing Sheets

(56) References Cited

U.S. PATENT DOCUMENTS

| | | | |
|---|---|---|---|
| 2014/0365333 A1* | 12/2014 | Hurewitz | G06Q 30/0643 |
| | | | 705/26.9 |
| 2015/0066579 A1* | 3/2015 | de Paris | G06Q 30/0201 |
| | | | 705/7.29 |
| 2016/0203510 A1* | 7/2016 | Pregueiro | G06Q 30/0251 |
| | | | 705/14.45 |
| 2016/0283061 A1* | 9/2016 | DiPersia | G06Q 30/02 |
| 2016/0337307 A1* | 11/2016 | Ahrens | G06Q 10/10 |
| 2017/0076623 A1 | 3/2017 | Grimes et al. | |
| 2017/0364813 A1* | 12/2017 | Boyer | G06Q 10/0637 |
| 2018/0075492 A1 | 3/2018 | Squire et al. | |
| 2019/0259039 A1* | 8/2019 | Thomas | G06Q 30/0203 |

OTHER PUBLICATIONS smartmobiledirect.com, https://web.archive.org/web/20160513172405/http://smartmobiledirect.com, captured May 13, 2016.

\* cited by examiner

SYSTEMS AND METHODS FOR GENERATING A CUSTOM CAMPAIGN

CROSS-REFERENCE TO RELATED APPLICATIONS

This application is a continuation of U.S. patent application Ser. No. 15/260,946, filed Sep. 9, 2016, the disclosure of which is incorporated herein by reference in its entirety.

TECHNICAL FIELD

This disclosure relates to systems and methods for generating a custom campaign for an identified recipient. Specifically, this disclosure relates to tracking a recipient's interaction with marketing material, providing feedback related to that interaction to an interested content distributor, and generating a planned series of interactions tailored to the recipient based on that feedback.

BRIEF DESCRIPTION OF THE DRAWINGS

Non-limiting and non-exhaustive embodiments of the disclosure are described herein, including various embodiments of the disclosure with reference to the figures listed below.

DETAILED DESCRIPTION

Figure 1:
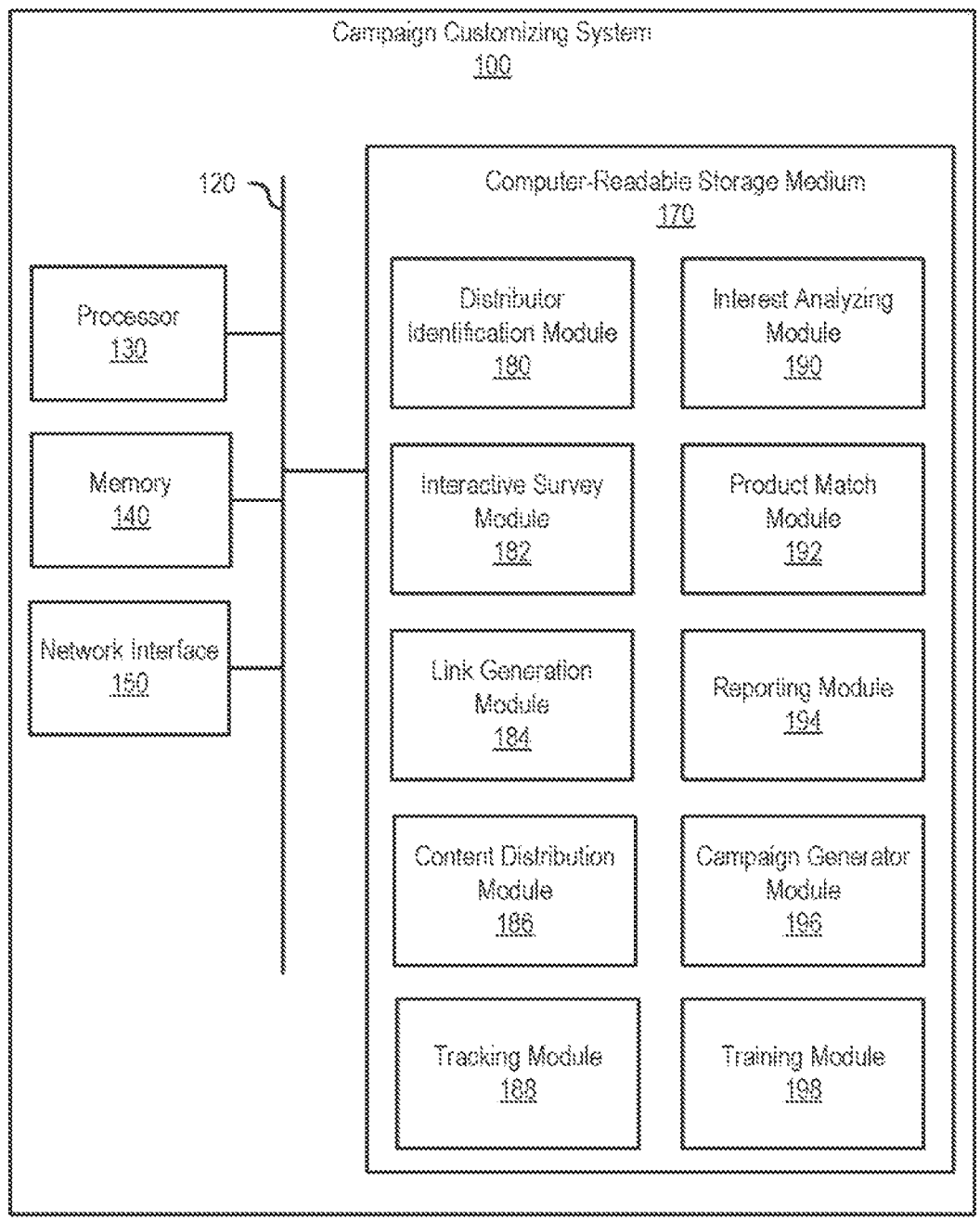
FIG. 1 is a block diagram of one embodiment of a campaign customizing system according to one embodiment.

This disclosure includes various embodiments of systems and methods for generating a custom campaign for an identified recipient. A custom campaign may be created by tracking a recipient's interaction with marketing material, providing feedback related to that interaction to an interested content distributor, and generating a planned series of interactions tailored to the recipient based on that feedback. Various embodiments and variations of these systems and methods are provided herein and are referred to as the "campaign customizing system."

Traditional marketing methods often suffer from a low sales conversion rate. One reason for the low conversion rate is that the marketing campaign is not personalized to each recipient. By utilizing a system or method for generating a custom campaign, distributors may personalize future engagements and increase their sales conversion rate.

In various embodiments, a campaign customizing system may store an interactive survey with multiple selectable channels. The interactive survey may include interactive elements such as audio, video, images, and PDFs. The interactive elements may present information to a recipient concerning the channels. For example, the audio may introduce the current channel's topic. Additionally, certain interactive elements if selected may navigate a recipient to one of the channels.

A channel may include questions concerning a distinct area of personal preference. For example, the channels may question a recipient's time allocation preference, product category interests, and retirement goals. The questions may be phrased in a non-invasive, open-ended form to encourage survey completion. For instance, the questions may include what would you do if you had more time?

The campaign customizing system may also identifying a first content distributor. As used herein, the term content distributor is used in a broad sense of any person or entity that is distributing information regarding a product, idea, political platform, and/or service, including the sale or promotion of such products, ideas, political platforms, and/or services. Accordingly, a content distributor may be, but is not limited to, a consultant, a salesperson, a realtor, a broker, a banker, a product distributor, a direct sales product distributor, a political candidate, a political activist, a political agent, a marketing agent, a business entity, and/or any subset, agent, representative, or associate of any of the above.

The content distributor may have a set of recipients associated with him/her. For example, the content distributor may have an address book within a distributor profile. Based on the address book, the content distributor system may create a first electronically selectable link to the interactive survey. The term "recipient" is used in a broad sense as any person, entity, group of persons/people, and/or group of entities. For example, a content distributor may be said to distribute content to a recipient by posting content on a Facebook wall, in which case the recipient may be a group or set of individuals who have access to view the content distributor's Facebook wall.

The first link may be uniquely associated with a first recipient selected among the set of recipients associated with the first content distributor. As described herein, the campaign customizing systems and methods may create or allow content distributors to selectively create a unique set of links, such that a unique link is created for each content distributor-recipient combination. That is, each of a plurality of content distributors may distribute content to a plurality of recipients. The plurality of recipients of each of the content providers may overlap in that a given individual may be the recipient of customized distributor content from more than one content distributor and/or through more than one distribution channel.

The campaign customizing systems and methods may create and distribute at least one unique link for each permutation of a content distributor, recipient, and/or interactive survey. According to various embodiments, each link is selectable by a recipient and/or their successors (e.g., entities to whom the recipient forwards a link) and each link is traceable. In some embodiments, the campaign customizing system may store a customized survey for each link. Alternatively, there may be only one generic survey and each link may identify which recipient is accessing the survey.

The campaign customizing system may distribute, over a network, the electronically selectable link to the first recipient. For example, the distributor may share the link with the recipient via email, Facebook, Twitter, other social media sites, SMS, or MMS. Alternatively, the distributor may share the link with a recipient via short range communication standards such as Bluetooth or NFC.

The campaign customizing system may receive answers to the questions concerning an area of personal preference from the recipient. Each recipient may have a profile associated with him/her. When the campaign customizing system receives an answer, the system may modify the profile associated with the recipient who answered the question. Each answer may be stored and associated with a profile.

The campaign customizing system may also collect other data that indicate interest in a particular area. For example, the system may determine a time spent in each selectable channel by the first recipient. The channels in which a recipient spends more time may be of more interest to the recipient than the other channels. The system may also track the interactive requests made by a recipient. An interactive request may include any recipient-made selection of the interactive elements or channels. The system may track the order in which the interactive elements are selected to gauge interest. For example, the first channel selected by the user may indicate the recipient is most interested in that channel. In some embodiments, the campaign customizing system may also track the recipient's eye movement.

The campaign customizing system may identify a plurality of interests of the first recipient based on at least (1) the received answers, (2) the time spent in each selectable channel, (3) the interactive requests, and (4) the eye movement of the first recipient. For example, the system may generate a heat map that represents the time spent in each selectable channel and the eye movement of the recipient. The heat map may show a distributor what areas the recipient spent the most time in, which likely correlates with the level of interest.

Further, the campaign customizing system may match at least one related product from a set of products to the identified plurality of interests. The matching may be done based on tags associated with a product. The system may generate a plurality of tags that indicate an area of interest, and associate one or more of the tags with each product to indicate relevant interests. In one embodiment, the system may automatically select a product that is relevant to the recipient's interest. In another embodiment, the system may present several relevant products to a content distributor and the content distributor may select one or more products to be matched to the interest.

The campaign customizing system may also generate a custom tailored campaign associated with the first recipient based on the at least one related product and the plurality of interests of the first recipient. In one embodiment, the custom tailored campaign may be created based on simple deducing methods. In another embodiment, the campaign customizing system may leverage algorithms, machine learning, and artificial intelligence to customize a campaign. The campaign customizing system may also profile users to establish a more intelligent system for future campaigns.

A campaign may include a series of communications from the first content distributor to the first recipient relating to the at least one product. The communications may include an email, SMS, MMS, social media post, phone call, or in-person follow up. The communication may demonstrate a product, invite the recipient to a product party, provide a reminder, include more information about a product, or encourage the recipient to make a purchase. The campaign customizing system may provide a library of content that may be used to create a communication. The library may include content items that include text, images, videos, articles, URL links, messages, advertisements, notices, testimonials, and/or any other informational content that may be of interest to a recipient. A content distributor may combine various content to create a customized communication. In various embodiments, the content distributor may further customize one or more of the content items and/or add custom content with personalized inputs.

Specific embodiments of the campaign customizing system and methods are described below with reference to the drawings, including representative embodiments of GUIs for interacting with various portions of a campaign customizing system. It is appreciated that any number of variations may be made to the specific GUI embodiments that are illustrated.

Throughout this disclosure well-known structures, material, or operations are not shown or described in detail to avoid obscuring aspects of this disclosure. For instance, while many of the features and functionalities of the campaign customizing system are described in terms of user interaction through a GUI, in some embodiments, the interaction with the campaign customizing system may be facilitated through one or more application programming interfaces (APIs).

In such embodiments, external entities, computer systems, and electronic components such as databases, libraries, and the like, may interact with the campaign customizing system to utilize one or more of the functionalities of the campaign customizing systems and methods described herein via an API that includes specifications for variables, routines, data structures, object classes, content types, sizes, and other interaction details. APIs are generally understood by those of skill in the art and the various functionalities and variations of APIs known to those of skill in the art are within the scope of this disclosure. Integration of the campaign customizing system with existing customer websites, customer relationship management (CRM) tools, databases, shopping carts, inventory analysis systems, analytic generation tools, fulfillment tools, and other electronic systems in an e-commerce or related industry may be facilitated through the use of one or more APIs.

Embodiments and implementations of the campaign customizing systems and methods described herein may include various steps, which may be embodied in machine-executable instructions to be executed by a computer system. A computer system may include one or more general-purpose or special-purpose computers (or other electronic devices). The computer system may include hardware components that include specific logic for performing the steps or may include a combination of hardware, software, and/or firmware.

Embodiments may be provided as a computer program product including a computer-readable medium having stored thereon instructions that may be used to program a computer system or other electronic device to perform the processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell, Microsoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes one or more processors and/or memory computer systems may also include various input devices and/or output devices. The processor may include a general purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, RAM, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, PHP, .Net, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular abstract data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general purpose computers, computer programming tools and techniques, computer networks and networking technologies, digital storage media, authentication, access control, and other security tools and techniques provided by public keys, encryption, firewalls, and/or other means.

The embodiments of the disclosure are described below with reference drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. That is, this disclosure includes every combination and permutation of the various embodiments and functionalities described herein, including permutations and combinations that are mutually exclusive inasmuch as they may be harmonized and/or used at discrete time intervals.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor do the steps need to be executed only once.

FIG. 1 is a block diagram of a campaign customizing system according to one embodiment. Various modules 180-198 may perform operations to generate a custom tailored campaign. As illustrated, a processor 130 may be in communication with a memory 140, a network interface 150, and/or a computer-readable storage medium 170 (e.g., a non-transitory computer readable storage medium) via a bus 120. The computer-readable storage medium 170 may include one or more modules 180-198 implemented in hardware, firmware, and/or software for facilitating campaign customization.

In various embodiments, one or more of the illustrated modules 180-198 may be removed and/or implemented by a different system and/or in a different location. Some of the modules 180-198 may be implemented in software and others in hardware. Some of the modules 180-198 may be implemented and/or controlled by a first entity and others of the modules 180-198 may be implemented and/or controlled by one of more different entities. In some embodiments, some of the method steps and/or modules 180-198 described in connection with the campaign customizing system and methods may be omitted and/or modified without departing from the scope of this disclosure. One or more communications networks may facilitate communication between the various modules, databases of content, servers, and/or client devices useful for implementing the embodiments described herein.

As illustrated, a distributor identification module 180 may be configured to identify a content distributor. For example, the distributor identification module 180 may receive login credentials of a user and establish a session for the particular user. Identifying a particular content distributor may be useful in creating subsequent links that are associated with the particular user, identifying recipients associated with the user, and other settings and configurations. A content distributor may log in to view, for example, a history of content distributions, statistics, reports, scheduled distributions, contact lists, and current interactive survey results. According to various embodiments, the distributor identification module 180 may identify a content distributor based on one or more of a username, a password, a login credential, an IP address, a MAC address, a biometric identification, and a network session identification.

According to various embodiments, an interactive survey module 182 may generate an interactive survey with multiple selectable channels to be stored on the memory 140. The interactive survey module 182 may arrange visual and audio elements such as audio, video, images, and PDFs to create one or more channels. In response to a recipient selecting a channel, the interactive survey may present the recipient with the visual and/or audio elements contained in the channel. Each channel may concern a distinct area of personal preference.

In one embodiment, the interactive survey module 182 may arrange the visual and audio elements automatically for a channel. For example, a content distributor may select a template from a template library. Alternatively, the interactive survey module 182 may generate a template based on previous templates or general layout principles. The template may be portioned into sections. The template may allocate each section for text, images, video, or PDFs. Once the channels topic is determined, the interactive survey module 182 may search for an element library for elements related to the topic and insert the most relevant results in the sections.

In another embodiment, a content distributor may select which content to be included in a channel. Additionally, the interactive survey module 182 may assist the content distributor in selecting. For example, the interactive survey module 182 may search for elements related to the topic and present the results to the content distributor. The content distributor may indicate which elements to include in the channel and the arrangement of the elements.

In yet another embodiment, the interactive survey module may store several generic channels for a variety of topics. Content distributors may personalize each channel for a recipient. The interactive survey module may store the personalized channel for future use by authorized content distributors. Authorized content distributors may be the content distributors that created the personalized channel (creator), a content distributor within the same organization as the creator, or anyone the creator authorizes.

The topics included in the survey may be pre-planned. In one embodiment, an organization may provide a plurality of content distributors with a pre-planned survey. Pre-planned topics can provide comparable results for reliable analytics.

In other embodiments, the interactive survey module 182 may select topics for the channels based on the location of the recipient. The interactive survey module 182 may determine popular topics for a recipient's area based on the results of previous surveys sent to other recipients in the same area. For example, the interest analyzing module 190 may aggregate the interests of a plurality of recipients in a target area and determine at least one prevalent interest. By selecting topics base on the location of the recipient, the interactive survey may be more relevant to the recipient.

A link generation module 184 may generate one or more links that route a recipient to the interactive survey. The link generation module 184 may create a unique link for at least each recipient. If a unique link is selected, the campaign customizing system 100 can identify both the distributor and the recipient of the selected link.

In various embodiments, each link may be associated with a particular interactive survey, distribution channel, distribution schedule, or other distribution characteristic. This association may facilitate reporting click-through rates, recipients' interests, and/or conversion rates at a granular level. In some embodiments, each content item within a particular customized distributor content item may be associated with a unique link as well. Thus, a unique selectable, trackable link may be created for distribution for each recipient.

As an example, if 15 unique content distributors each prepared a unique customized distributor content item for distribution to 10 recipients each (i.e., 150 unique recipients), then at least 150 unique links would be distributed. In some embodiments, a unique link may be made for each distribution channel utilized to provide granular tracking of the relative success rates of each distribution channel. Accordingly, in the example above, if each of the 15 content distributors scheduled the customized distributor content item for distribution via four distribution channels (e.g., Facebook, email, Twitter, and LinkedIn), then at least 600 unique links would be created.

In various embodiments, a content distribution module 186 is configured to distribute the link and campaign content (e.g., advertisements, demonstrations, and invitations) via one or more distribution channels. Examples of distribution channels include, but are not limited to, email systems, social media networks, SMS messaging systems (including services similar to Apple's iMessage), MMS messaging systems, mobile application notifications, and digital advertisements. Examples of social media networks are innumerable and include, but are not limited to, Alm, CoComment, Delicious, Digg, Facebook, Flickr, Friendster, Google Plus, Google chat, iJigg, Kongregate, Last.fm, Twitter, Snapchat, etc.

The content distribution module 186 may allow a content distributor to schedule and/or stage the distribution of one or more links and campaign content. Such scheduling may include adjustable distribution schedules based on date and time, recipient groupings, and distribution channel, and/or in response to recipient actions, in response to recipient requests, and/or in response to a defined event (where an event is understood in the context of event-driven architectures (EDAs)).

The content distribution module 186 may facilitate the distribution of the links in conjunction with the distribution of the customized distributor content items. For example, a customized distributor content item may comprise a Facebook post that includes a title caption content item, a body of text content item, and a hyperlink to an interactive survey. The hyperlink to the external video may be a standard URL. The link generation module 184 and/or the content distribution module 186 may convert the standard URL to a plurality of unique links for each recipient, and possibly for each recipient via each type of distribution channel. Each of these links may comprise a shortened URL with tracking capabilities.

A tracking module 188 may receive answers to the interactive survey questions, determine how much time each recipient spends in each channel, track interactive requests (e.g., channels selected and audio and visual elements chosen), and track each recipient's eye movement. Eye movement can be tracked via a camera on the recipient's device. As unique links are created for each recipient, even if a large number of content distributors are using the same campaign customizing system, each answer by any recipient can be tracked and stored with the correct recipient profile.

An interest analyzing module 190 may identify a plurality of interests of a recipient based on the data tracked by the tracking module 188. For example, the interest analyzing module 190 may identify what channels a recipient spent the most time in and identify those topics as areas of interest for the recipient. A more detailed examination of a recipient's interest may be performed with the tracked eye movement. For instance, the interest analyzing module 190 may determine where the recipient's eyes spent the most time in each channel. The eye movement may indicate a recipient is interested mostly in a particular image, question, or video in the channel. Finally, the answers to the surveys question may provide an indication of interest directly from the recipient. Because the answers are directly from the recipient, they may be given more weight in determining interest.

A product match module 192 may retrieve products related to an interest of a recipient. In one embodiment, the content, distributor may match the product to the area of interest based on the tracked data. In another embodiment, the product match module 192 may associate tags with each of a set of products available to the content distributor. The tags may indicate what interest the product is related to. If a product is related to multiple interests, the product match module 192 may associate multiple tags with the product. Each tag may have a relevancy score that represents how related the product is to the interest associated with the tag.

In one embodiment, the tags may be used to match products to a recipient's interest. For example, the product match module 192, may automatically select the most related products based on the relevancy score of the tags. The selection may also factor in the sales performance of a product, the area of the recipient, and the content distributor. Alternatively, the product match module 192 also may present a set of products that are related to the recipient's interest and receive input from a content distributor selecting one or more products to be matched to the recipient's interest.

A reporting module 194 may generate and provide a report that represents a recipient's interests as identified by the interest analyzing module 190. The report may be represented by a heat map. The heat map may indicate the time spent in each selectable channel and the recipient's eye movement. The reporting module 194 may also distribute the heat map to a content distributor.

The campaign generator module 196 may customize a campaign based on the identified interests of a recipient and the products matched to those interests. In one embodiment, the campaign generator module 196 may create a custom campaign based on simple deducing methods. In another embodiment, the campaign customizing system may leverage algorithms, machine learning, and artificial intelligence to customize a campaign. The campaign customizing system may also profile users to establish a more intelligent system for future campaigns. For example, the interest analyzing module 190 may identify that an interest of a recipient is anti-aging products. The product match module 192 may match the interest to a wrinkle cream that the content distributor is selling. The campaign generator module 196 may then send a series of emails to the recipient about the wrinkle cream. In some embodiments, the campaign generator module 196 may suggest communications to send and the content distributor may approve or deny the suggestions. In another embodiment, the content distributor may create a pre-scripted campaign that the campaign generator module may modify.

In some embodiments, the campaign generator module 196 may aggregate information from a plurality of interactive surveys to generate a public campaign. For example, the content distributor may indicate a target area for the public campaign. The campaign generator module 196 may then aggregate all the information from surveys taken in the target area. The interest analyzing module 190 may then identify a prevalent interest from the aggregated information. The campaign generator module may then produce advertisements that can be viewed by the public in the target area. The advertisements may include billboards, Internet advertisements, mailers, television and radio commercials, and/or automated telephone calls.

Figure 2:
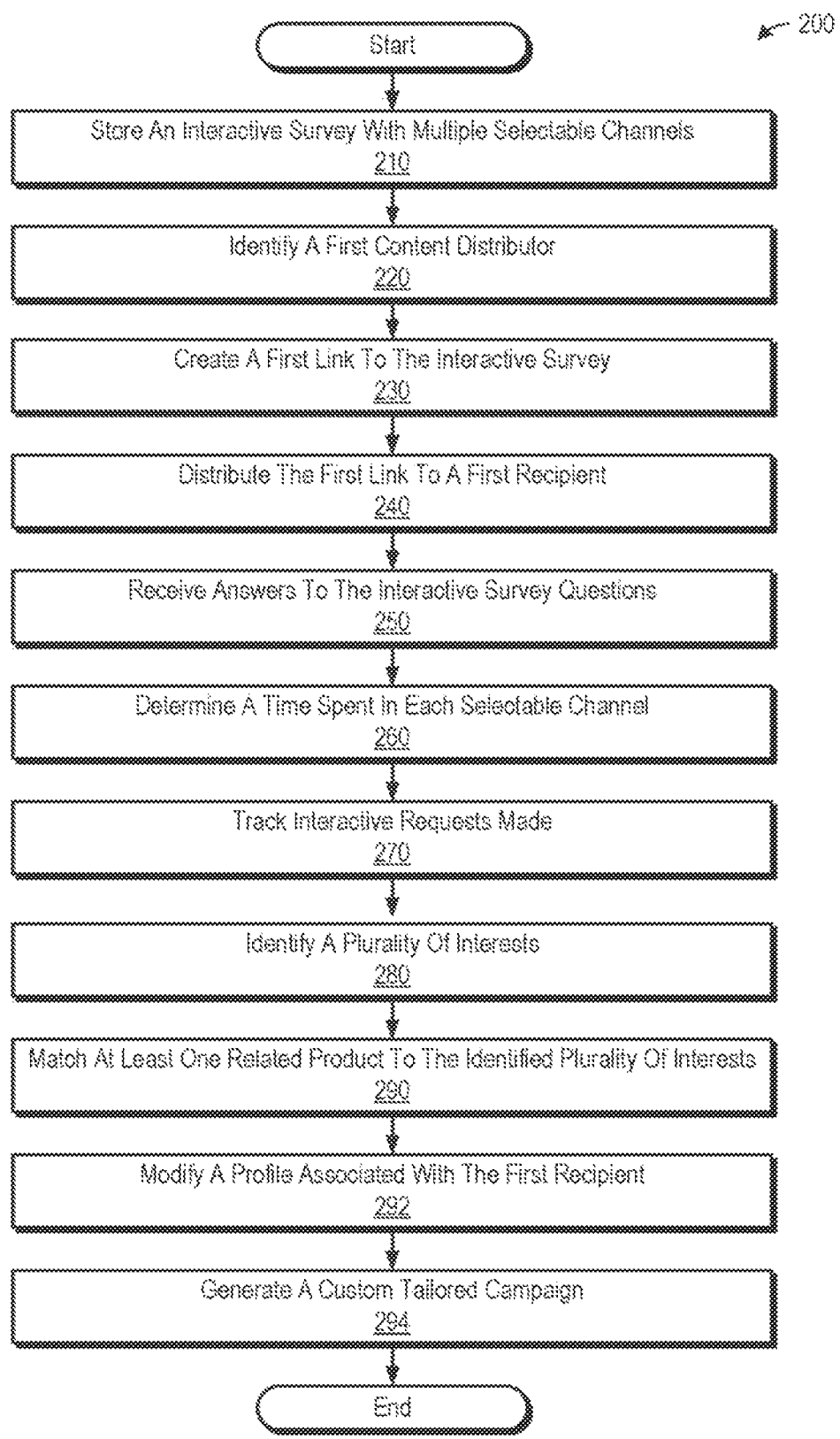
FIG. 2 is a flow chart of a method for generating a custom tailored campaign for an identified recipient, according to one embodiment.

FIG. 2 is a flow chart of a method 200 for generating a custom tailored campaign, according to one embodiment. As illustrated, a system may store an interactive survey with multiple selectable channels 210. Each channel may include questions about a distinct area of personal preference. The system may identify a first content distributor 220. The content distributor may have a distributor profile and a contact list. The system may create a first link to the interactive survey 230. The first link may be uniquely associated with a first recipient selected from among the set of recipients in the content distributor's contact list.

The system may track a variety of data when the recipient takes the interactive survey. For instance, the system may receive answers to the interactive survey from the first recipient 250. The system may determine a time spent by the first recipient in each selectable channel 260. Further, the system may track interactive requests made. Tracked interactive requests may include the order the channels were selected in, the audio and video played, and the images enlarged. In some embodiments, the recipient's eye movement may be tracked.

Based on the tracked data, the system may identify a plurality of interests of the first recipient 292. For example, the system may identify interest based on (1) the received answers, (2) the time spent in each selectable channel, and (3) the interactive requests. The system may match at least one related product from a set of products to the identified plurality of interests 290.

The system may also modify a profile associated with the first recipient 292. The system may modify the profile by storing the answers to the survey, the time spent in each channel, the interactive requests, the identified interests, and/or the matched products.

Finally, the system may generate a custom tailored campaign 294 for the first recipient. The campaign may be based on the matched related product and the interests of the first recipient. The campaign may include a series of communications from the first content distributor to the first recipient intended to induce a sale of the matched related products. A communication may be an email, social media post, SMS, MMS, telephone call, and/or in-person follow up. The system may generate suggested communications based on the content distributor, the recipient, and/or an organization that the content distributor or product is affiliated with.

Figure 3:
FIG. 3 illustrates one embodiment of a graphical user interface (GUI) of a narration page of a system for generating a custom tailored campaign.

FIG. 3 illustrates one embodiment of a graphical user interface (GUI) of a narration page 300 of a system for generating a custom tailored campaign. The narration page 300 facilitates the selection of a narrator for an interactive survey. The narrator may be an auditory guide that introduces topics, provides instructions, and gives requested additional information. A recipient of the interactive survey may choose the gender of the narrator. In some embodiments the selection of the narrator is an interactive request that may be used to identify the recipient's interests. In some instances, a content distributor may be delivering the interactive survey to the recipient in person. In such a situation, it would be advantageous to choose no narrator so the content distributor may provide the narration.

Figure 4:
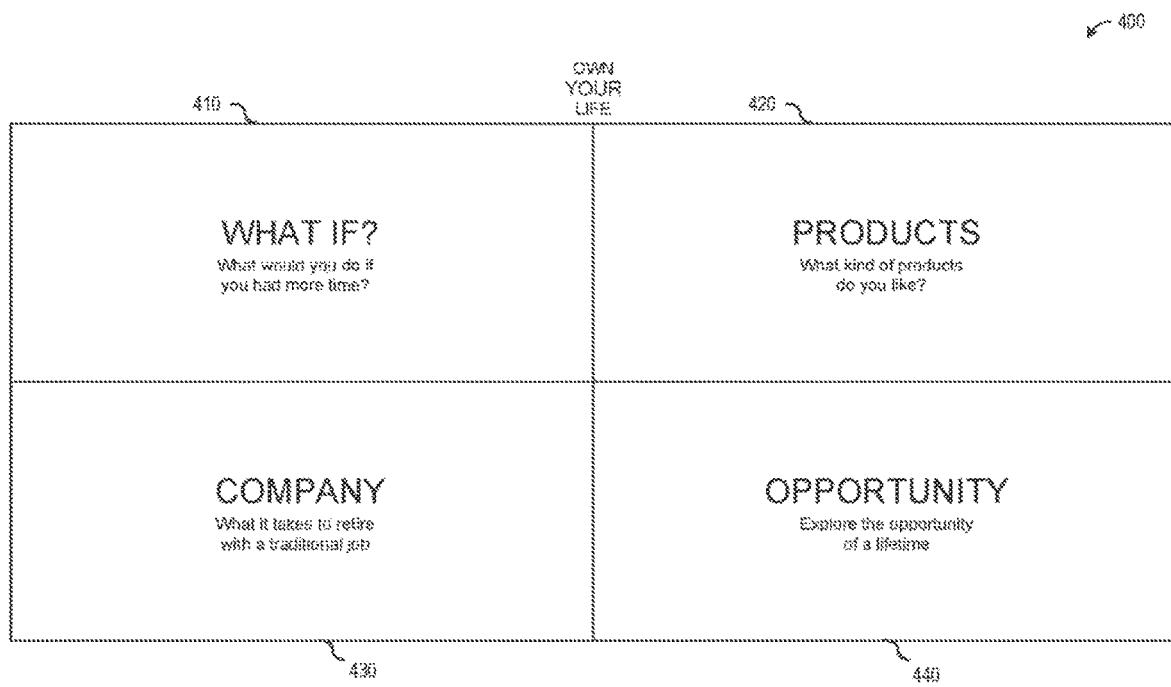
FIG. 4 illustrates one embodiment of a GUI of a channel selection tool for navigating between channels.

FIG. 4 illustrates one embodiment of a GUI of a channel selection tool 400 for navigating between channels. As illustrated, an interactive survey may contain four channels. These channels may include a time allocation channel 410, a product channel 420, a retirement channel 430, and an opportunity channel 440. These channels may be modified to include various topics such as hobbies, goals, and vacations. A recipient may select any of the channels to navigate to a set of questions and be provided with information about the selected channel's topic.

Figure 5:
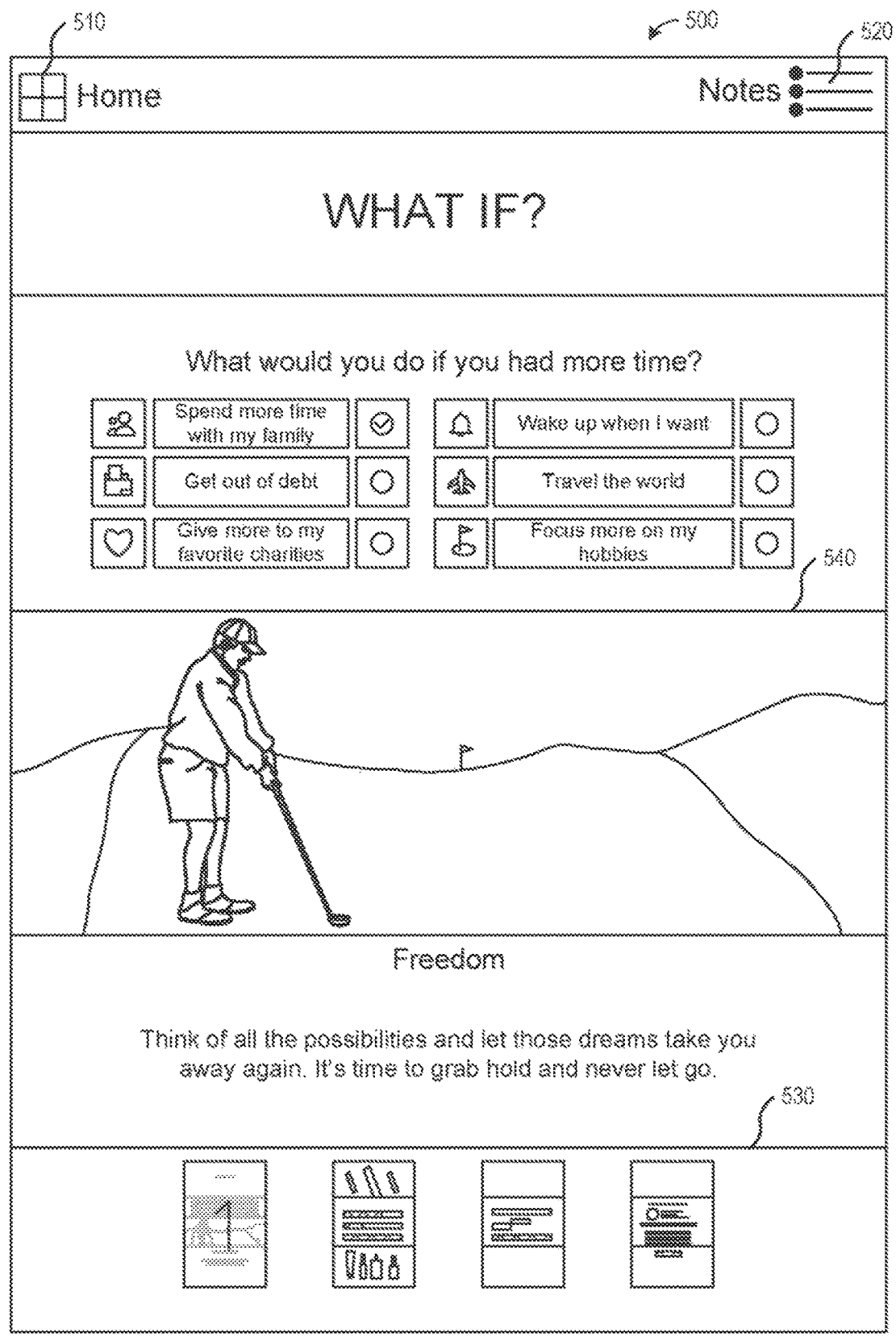
FIG. 5 illustrates one embodiment of a GUI for a time allocation channel.

FIG. 5 illustrates one embodiment of a GUI for a time allocation channel 500. The time allocation channel may include a plurality of interactive elements including questions, videos, images, audio, and navigation elements (e.g., 510, 520, and 530). The campaign customizing system may track a recipient's interaction with each of these interactive elements, and use the tracked information to identify one or more interests of a recipient.

In one embodiment, the campaign customizing system may track a recipient's eye movement to identify the recipient's interests. For example, banner 540 may cycle through several images, each representing a different interest (e.g., golf, family, house, travel, sleeping). If the recipient is more interested in one of the images, the recipient's eyes will likely remain on the image for a longer period of time. The campaign customizing system may use the tracked eye movement to identify which image attracts the recipient's eyes the most and therefore determine an interest of the recipient.

The navigation elements may include a home button 510, a notes icon 520, and a channel selection overlay 530. The home button 510 may navigate the recipient to the channel selection tool shown in FIG. 4. The notes icon 520 may navigate the recipient to a script of the audio associated with the time allocation channel 410. The channel selection overlay 530 may provide a way for the recipient to navigate to each of the channels without having to return to the channel selection tool. The channel selection overlay 530 may selectively be minimized. Each of the channel icons in the selection overlay may be PDFs of the channels. Using PDFs may increase the detail visible to a recipient.

Figure 6:
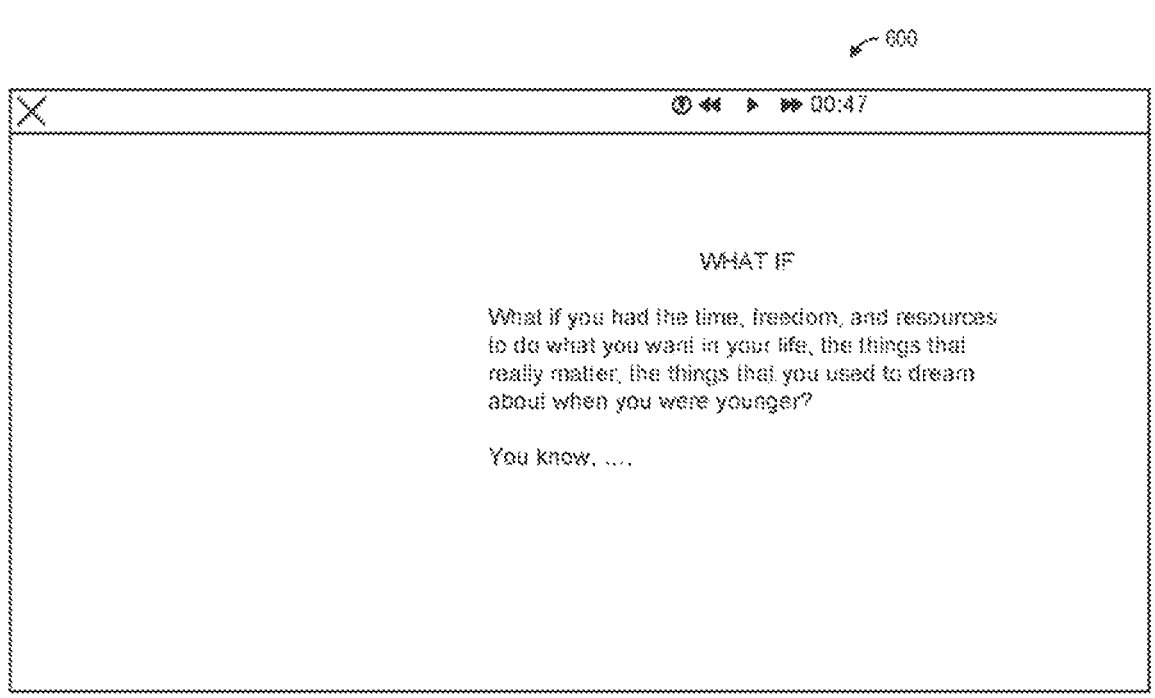
FIG. 6 illustrates one embodiment of a GUI for a script for the time allocation channel.

FIG. 6 illustrates one embodiment of a GUI for a script 600 for the time allocation channel. The script may provide a content distributor with dialogue for an in presentation. A recipient may also use the script to provide a visual of the narrator's dialogue. In some embodiments, the script 600 GUI may also allow a recipient or content distributor to make notes on the script.

Figure 7:
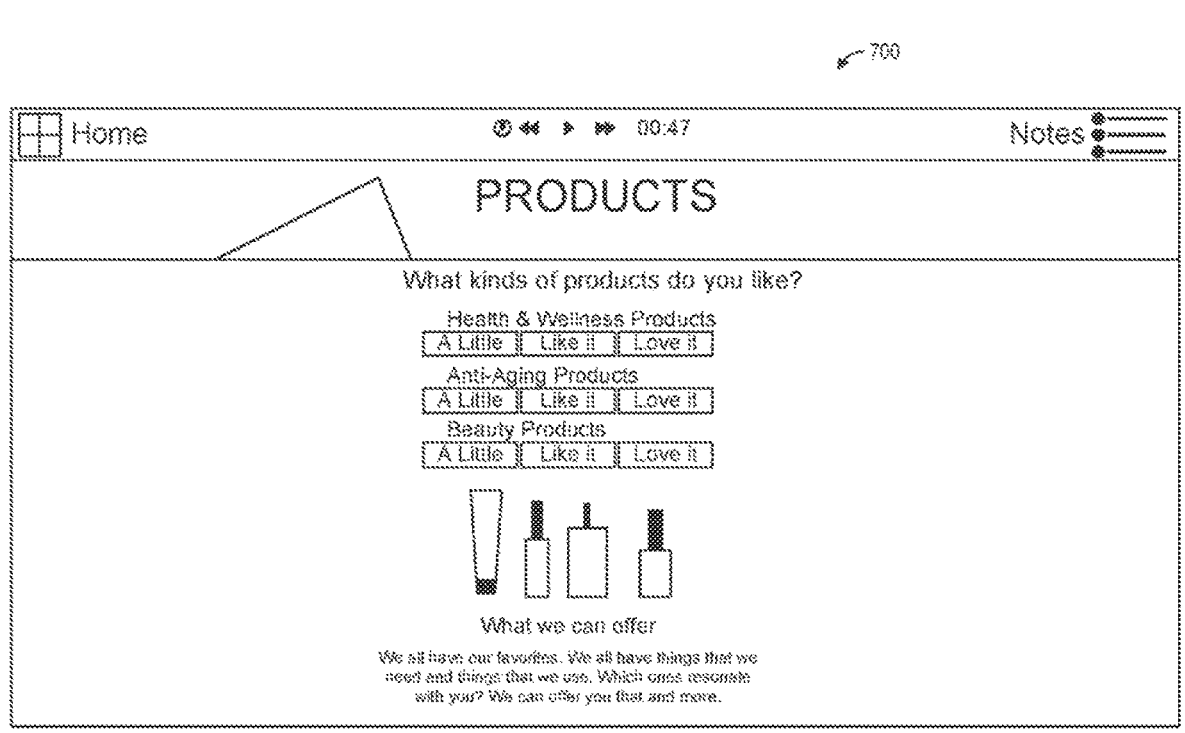
FIG. 7 illustrates one embodiment of a GUI for a product channel.

FIG. 7 illustrates one embodiment of a GUI for a product channel 700. The product channel may ask a recipient to rank product categories. The product channel 700 may include a plurality of interactive elements including questions, videos, images, audio, and navigation elements. The campaign customizing system may track a recipient's interaction with each of these interactive elements, and use the tracked information to identify one or more interests of the recipient.

Figure 8:
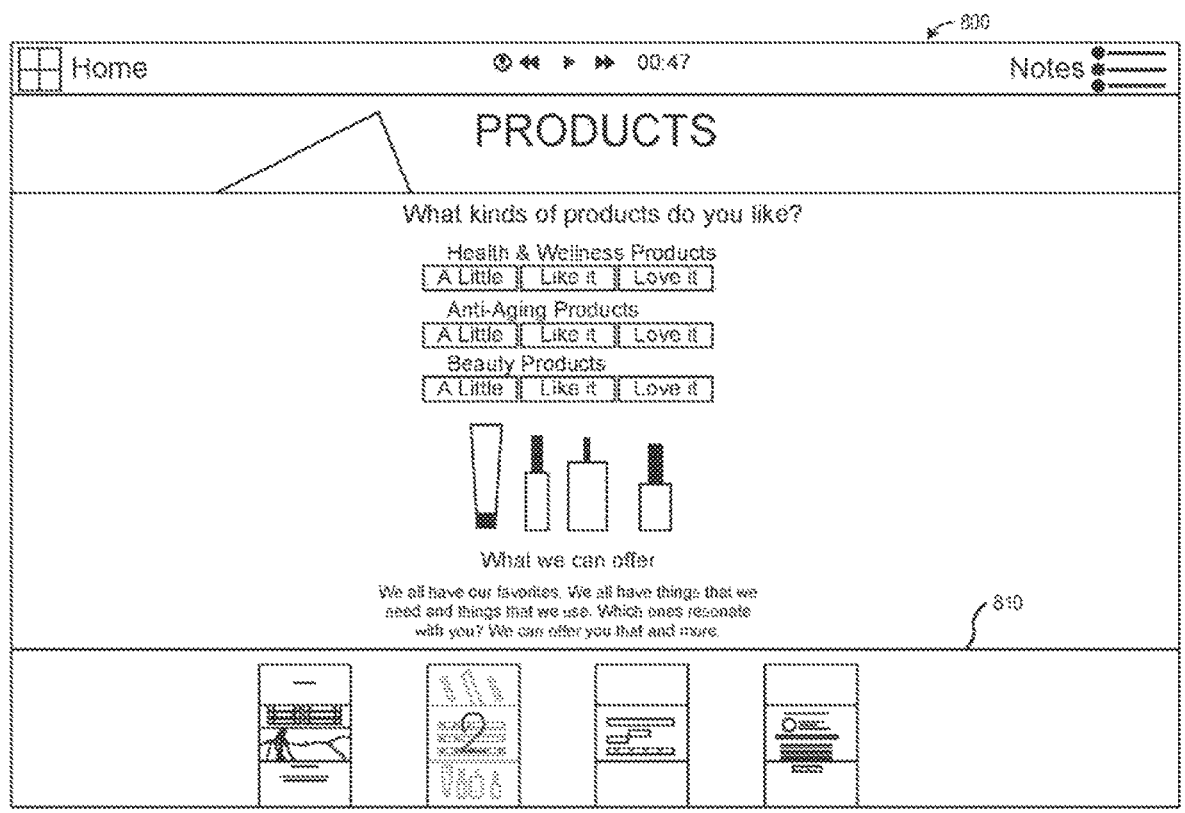
FIG. 8 illustrates a GUI for a product channel with a channel selection overlay.

FIG. 8 illustrates a GUI for a product channel 800 with a channel selection overlay 810. In one embodiment, the channel selection overlay 810 may appear after the narration audio has played. In another embodiment, the channel selection overlay 810 may appear in response to a recipient's action. A recipient's action may include answering questions, scrolling down on the channel, or swiping up from the bottom of the channel.

Figure 9:
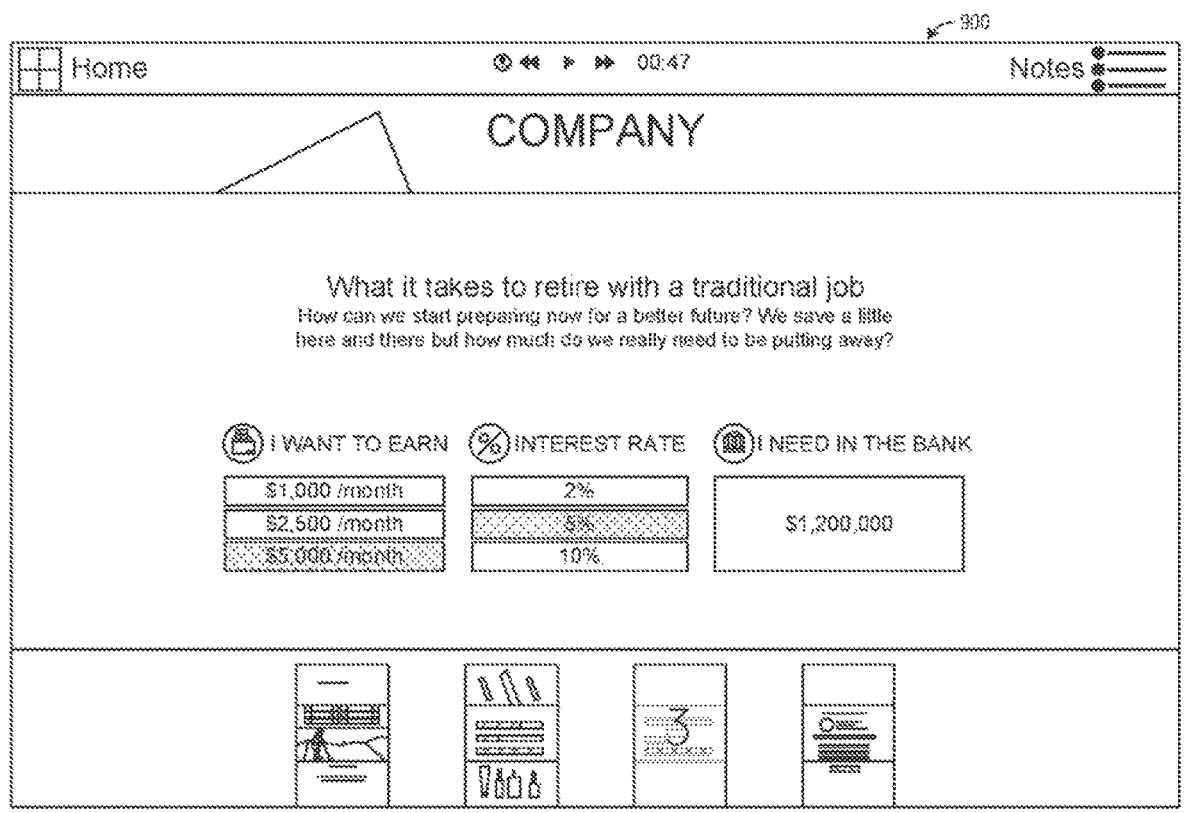
FIG. 9 illustrates one embodiment of a GUI for a retirement channel.

FIG. 9 illustrates one embodiment of a GUI for a retirement channel 900. The product channel may ask a recipient about retirement goals. The retirement channel 900 may include a plurality of interactive elements including questions, videos, images, audio, and navigation elements. As shown the retirement channel 900 may also include a retirement calculator. The campaign customizing system may track a recipient's interaction with each of these interactive elements, and use the tracked information to identify one or more interests of the recipient.

Figure 10:
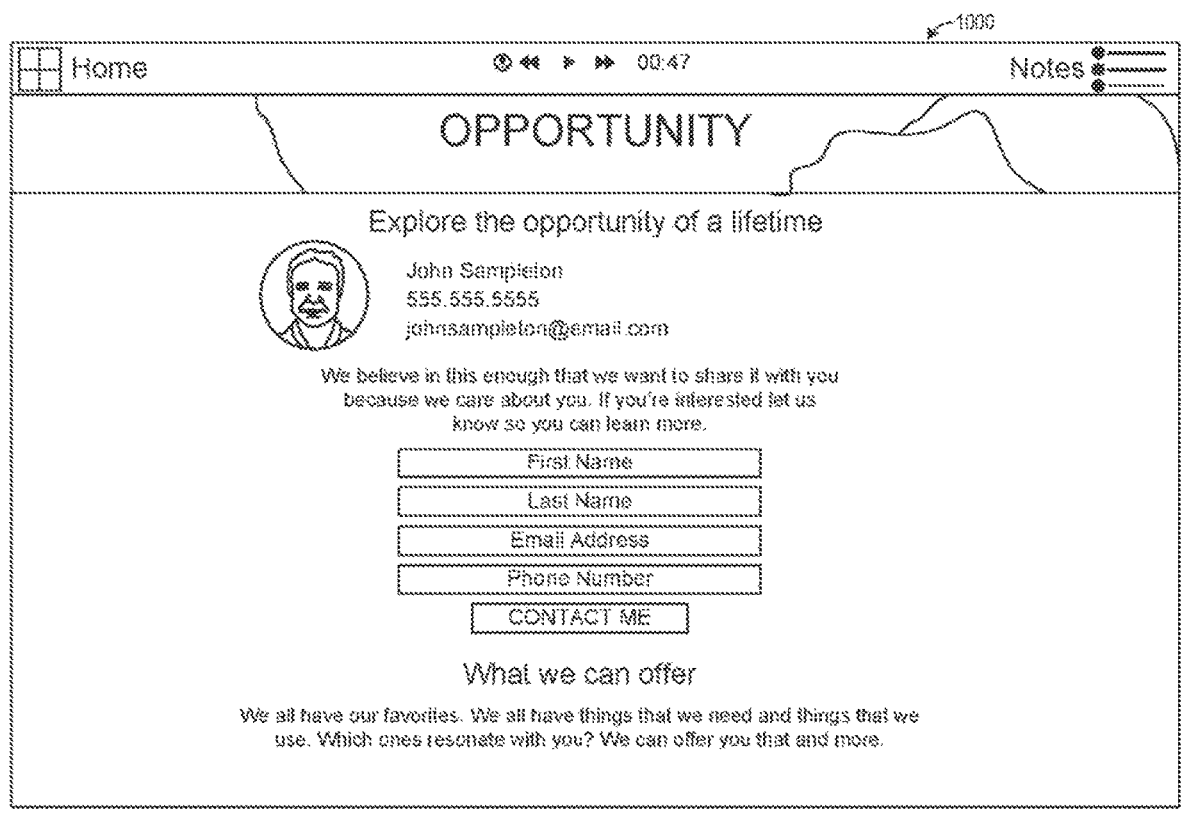
FIG. 10 illustrates one embodiment of a GUI for an opportunity channel.

FIG. 10 illustrates one embodiment of a GUI for an opportunity channel 1000. The opportunity channel 1000 may ask a recipient for contact information. The opportunity channel 1000 may receive contact information from the recipient and distribute it to a content distributor.

Figure 11:
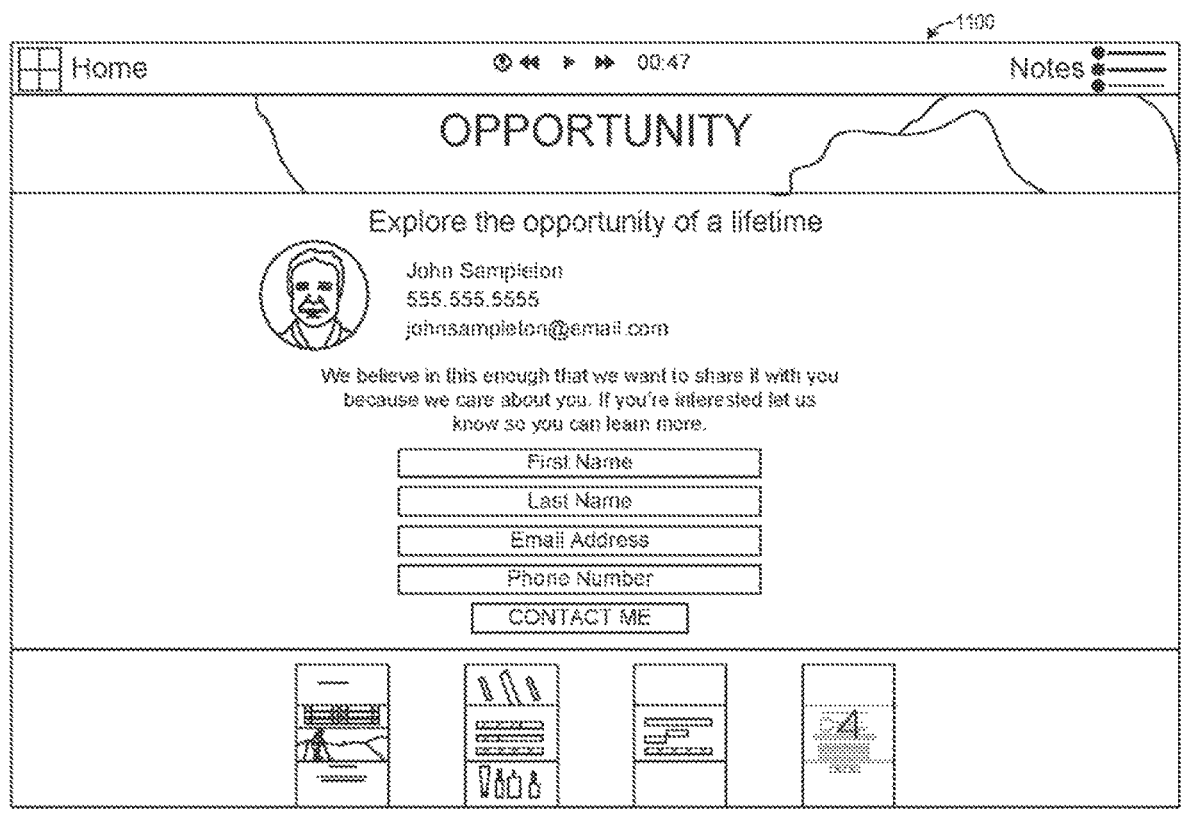
FIG. 11 illustrates one embodiment of a GUI for an opportunity channel with a channel selection overlay.

FIG. 11 illustrates one embodiment of a GUI for an opportunity channel 1100 with a channel selection overlay.

Figure 12:
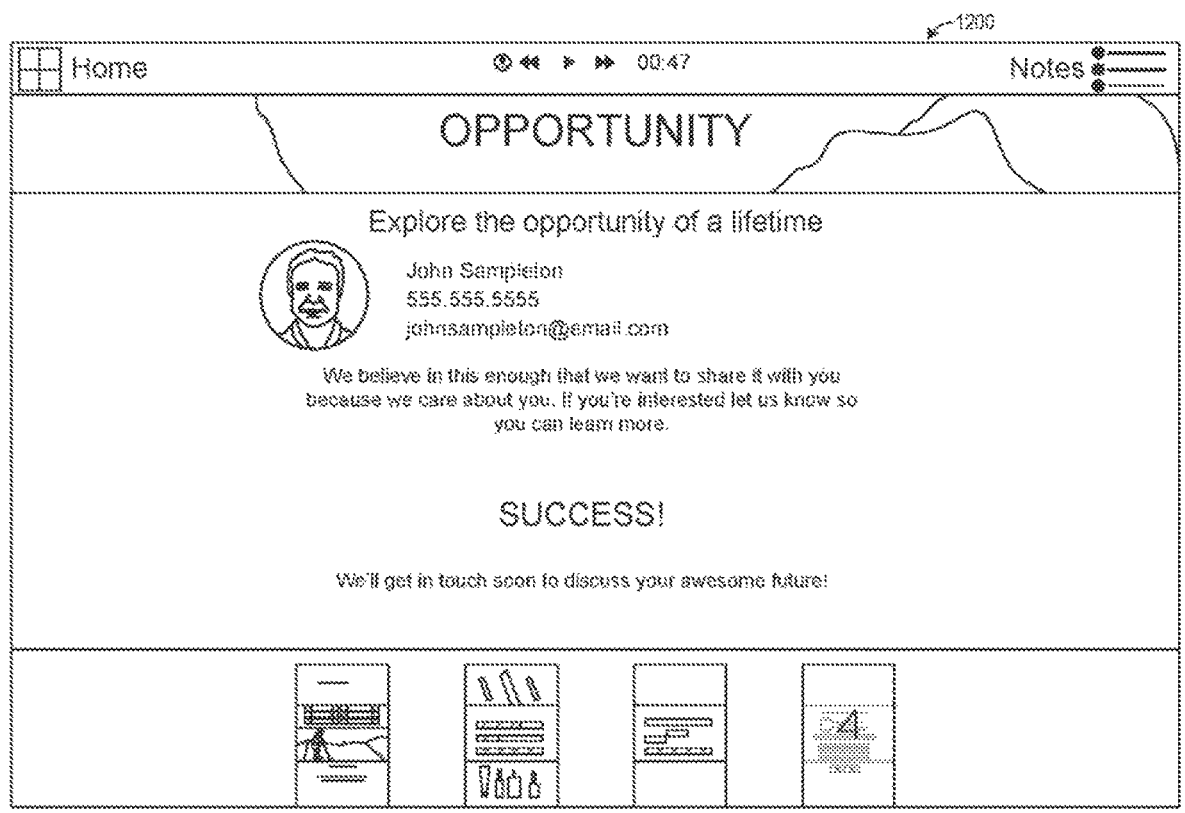
FIG. 12 illustrates one embodiment of a GUI for an opportunity channel after a recipient's contact information has been received.

FIG. 12 illustrates one embodiment of a GUI for an opportunity channel 1100 after a recipient's contact information has been received.

Figure 13:
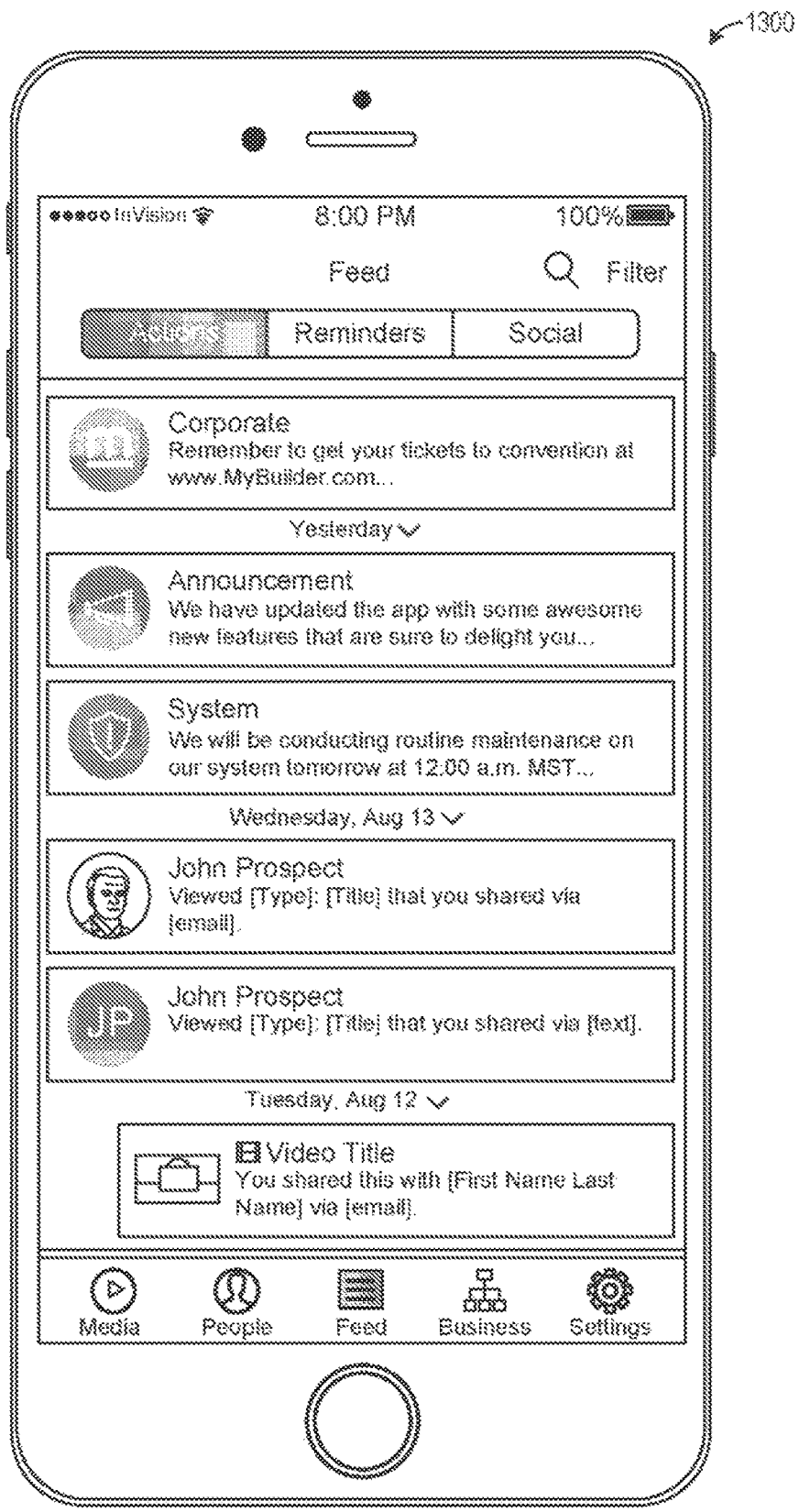
FIG. 13 illustrates one embodiment of a content distributor feed.

FIG. 13 illustrates one embodiment of a content distributor feed 1300. The feed 1300 may provide a content distributor with notifications about distributed content. For example, the feed 1300 may provide a notification after a recipient takes a survey, views a video, and responds to an message. By selecting a notification, the content distributor may view more details about that notification. The feed 1300 may also suggest material to the content distributor to send to a recipient.

Figure 14:
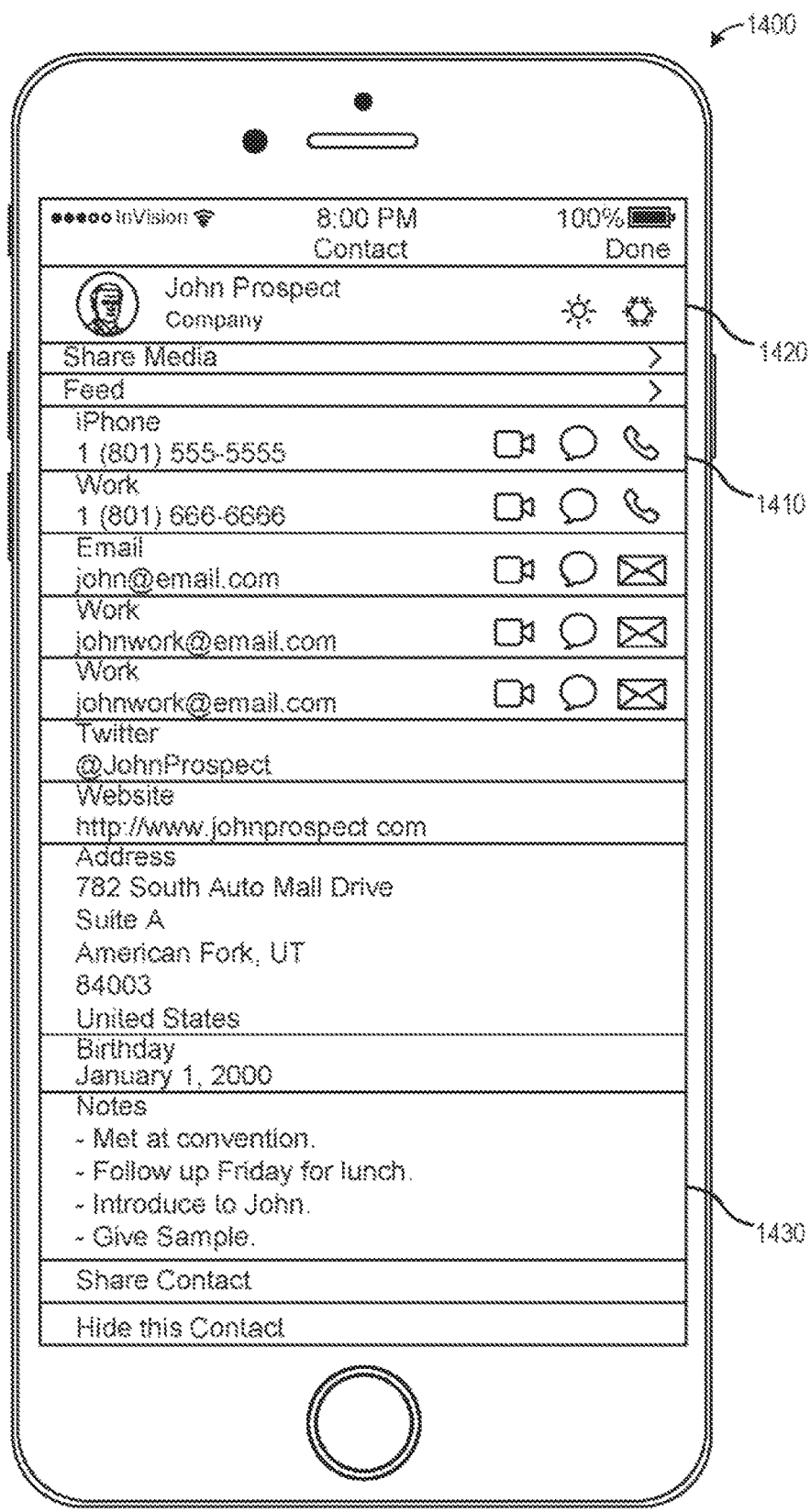
FIG. 14 illustrates one embodiment of a recipient profile.

FIG. 14 illustrates one embodiment of a recipient profile. As shown, the profile may contain contact information 1410, a lead indicator 1420, and notes 1430. The lead indicator 1420 may indicate how likely a recipient is to buy something. The content distributor may enter the notes 1430. Alternatively, the campaign customizing system may enter notes based on the information from interactive surveys. For example, the campaign customizing system may enter answers to survey questions, identified interests, interest heat maps, related products, and/or suggested communications.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to de construed as a critical, required, or essential feature or element. The scope of the present invention should, therefore, be determined by the following claims:

What is claimed is:

1. A method for generating a custom-tailored campaign for an identified recipient comprising:
    storing a set of one or more interactive elements associated with a content distributor, where the content distributor is further associated with a plurality of recipients;
    generating a plurality of electronically selectable links, where each electronically selectable link in the plurality of electronically selectable links is a URL which points to one of the interactive elements in the set of one or more interactive elements, and uniquely refers to a recipient in the plurality of recipients;
    distributing, over a network, the each respective electronically selectable link in plurality of electronically selectable links to the recipient to which each respective electronically selectable link uniquely refers;
    receiving data describing at least one area of personal preference from the recipient in response to an interaction with a given interactive element pointed to by a given electronically selectable link in the plurality of electronically selectable links, wherein the data are based on the interaction;
    modifying a profile associated with the recipient based on data describing the at least one area of personal preference;
    identifying a plurality of interests of the recipient based on the modified profile;
    matching at least one related product from a set of products to the identified plurality of interests; and
    generating a custom-tailored campaign associated with the recipient based on the at least one related product and the plurality of interests of the recipient, wherein the custom-tailored campaign comprises at least one communication from the content distributor to the recipient relating to the at least one product.

2. The method of claim 1, wherein the set of one or more interactive elements comprises at least one interactive element selected from the group consisting of: an audio element, a video element, and an image element.

3. The method of claim 1, wherein the at least one area of personal preference is at least one of time allocation preference, product category interests, and retirement goals.

4. The method of claim 1, wherein at least one of the elements in the set of one or more interactive elements is selected based on the location of the first recipient.

5. The method of claim 1, further comprising:
    generating a heat map based on interactions with the given interactive element associated with the given electronically selectable link; and
    providing the heat map to the content distributor.

6. The method of claim 1, further comprising:
    generating a plurality of tags that indicate an area of interest;
    associating at least one tag with each product in the set of products to indicate relevant interests; and
    wherein the matching of at least one related product to the plurality of interests is based on tags.

7. The method of claim 6, further comprising:
    determining all products associated with tags indicating at least one of the plurality interests of the recipient;
    presenting the products determined to be associated with tags indicating at least one of the plurality of interests of the recipient to the content distributor; and
    receiving input from the content distributor indicating the at least one product to match to the plurality of interests.

8. The method of claim 1, wherein each element in the set of one or more interactive elements is associated with a channel.

9. The method of claim 8, wherein the channel is selected by the content distributor.

10. The method of claim 9, wherein interacting with the given electronically selectable link directs a display to render the given interactive element based on their associated channels.

11. A system for generating a custom-tailored campaign for an identified recipient comprising:
    a processor; and
    a memory, the memory containing instructions configured to cause the processor to:
        store a set of one or more interactive elements associated with a content distributor, where the content distributor is further associated with a plurality of recipients;
        generate a plurality of electronically selectable links, where each electronically selectable link in the plurality of electronically selectable links is a URL which points to one of the interactive elements in the set of one or more interactive elements, and uniquely refers to a recipient in the plurality of recipients;
        distribute, over a network, the each respective electronically selectable link in plurality of electronically selectable links to the recipient to which each respective electronically selectable link uniquely refers;

receive data describing at least one area of personal preference from the recipient in response to an interaction with a given interactive element pointed to by a given electronically selectable link in the plurality of electronically selectable links, wherein the data are based on the interaction;

modify a profile associated with the recipient based on data describing the at least one area of personal preference;

identify a plurality of interests of the recipient based the modified profile;

match at least one related product from a set of products to the plurality of interests; and generate a custom-tailored campaign associated with the recipient based on the at least one related product and the plurality of interests of the recipient, wherein the custom-tailored campaign comprises a series of communications from the content distributor to the recipient relating to the at least one product.

12. The system of claim 11, wherein the set of one or more interactive elements comprises at least one interactive element selected from the group consisting of: an audio element, a video element, and an image element.

13. The system of claim 11, wherein each element in the set of one or more interactive elements is associated with a channel.

14. The system of claim 13, wherein the channel is selected by the content distributor.

15. The system of claim 14, wherein interacting with the given electronically selectable link directs a display to render the interactive elements associated with the at least one electronically selectable link based on their associated channels.

16. The system of claim 11, wherein the at least one area of personal preference is at least one of time allocation preference, product category interests, and retirement goals.

17. The system of claim 11, wherein at least one of the elements in the set of one or more interactive elements is selected based on the location of the recipient.

18. The system of claim 11, wherein the instructions further configure the processor to:

generate a heat map based on interactions with the interactive element associated with the at least one electronically selectable link; and provide the heat map to the content distributor.

19. The system of claim 11, wherein the instructions further configure the processor to:

generate a plurality of tags that indicate an area of interest;

associate at least one tag with each product in the set of products to indicate relevant interests; and wherein the matching of related products to the plurality of interests is based on tags.

20. The system of claim 19, wherein the instructions further configure the processor to:

determine all products associated with tags indicating at least one of the plurality interests of the recipient;

present the products determined to be associated with tags indicating at least one of the plurality of interests of the recipient to the content distributor; and receive input from the content distributor indicating the at least one product to match to the identified plurality of interests.

* * * * *